United States Patent
Aoki et al.

(10) Patent No.: US 9,060,132 B2
(45) Date of Patent: Jun. 16, 2015

(54) IMAGING APPARATUS

(71) Applicant: FUJIFILM Corporation, Tokyo (JP)

(72) Inventors: Takashi Aoki, Saitama (JP); Shigeru Kondo, Saitama (JP); Yoichi Iwasaki, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 14/452,605

(22) Filed: Aug. 6, 2014

(65) Prior Publication Data
US 2014/0347544 A1   Nov. 27, 2014

Related U.S. Application Data

(63) Continuation of application No. PCT/JP2013/054985, filed on Feb. 26, 2013.

(30) Foreign Application Priority Data

Mar. 28, 2012 (JP) ................................ 2012-074311

(51) Int. Cl.
| | |
|---|---|
| *H04N 5/225* | (2006.01) |
| *H04N 5/232* | (2006.01) |
| *G03B 13/06* | (2006.01) |
| *G03B 13/04* | (2006.01) |

(52) U.S. Cl.
CPC ............ *H04N 5/23293* (2013.01); *G03B 13/06* (2013.01); *H04N 5/2254* (2013.01); *G03B 13/04* (2013.01)

(58) Field of Classification Search
CPC .. H04N 5/2254; H04N 5/23293; H04N 7/144
USPC ........................................ 348/333.01, 333.09
See application file for complete search history.

(56) References Cited

U.S. PATENT DOCUMENTS

2013/0100332 A1* 4/2013 Kim et al. ..................... 348/335

FOREIGN PATENT DOCUMENTS

| JP | 58-106530 A | 6/1983 |
|---|---|---|
| JP | 3-292067 A | 12/1991 |
| JP | 2004-357123 A | 12/2004 |

(Continued)

OTHER PUBLICATIONS

International Search Report for PCT/JP2013/054985 mailed on Jun. 4, 2013.

(Continued)

*Primary Examiner* — Joel Fosselman
(74) *Attorney, Agent, or Firm* — Birch, Stewart, Kolasch & Birch, LLP (57) ABSTRACT

Provided is an imaging apparatus that is convenient for use with a combination of an optical finder and an electronic finder and is capable of minimizing manufacturing costs while preventing visibility in the finder from being lowered. In the EVF mode, a control unit 32 of a digital camera 10 moves members 18*b*, 18*c*, and 18*d* of an objective optical system 18 toward the subject along an optical axis L, and inserts a display unit 19 to a position of an imaging plane 21 with a distance between the member 18*d* and the imaging plane 21 secured to be long. In the OVF mode, the control unit 32 fixes the objective optical system 18 at a position determined in advance, and retracts the display unit 19 from a gap between the objective optical system 18 and an eyepiece optical system 20.

12 Claims, 9 Drawing Sheets

(56) References Cited

FOREIGN PATENT DOCUMENTS

| | | |
|---|---|---|
| JP | 2005-311764 A | 11/2005 |
| JP | 2008-158441 A | 7/2008 |
| JP | 2010-263538 A | 11/2010 |

OTHER PUBLICATIONS

Written Opinion of the International Searching Authority for PCT/JP2013/054985 mailed on Jun. 4, 2013.

* cited by examiner

IMAGING APPARATUS

CROSS-REFERENCE TO RELATED APPLICATIONS

This application is a Continuation of PCT International Application No. PCT/JP2013/054985 filed on Feb. 26, 2013, which claims priority under 35 U.S.C. §119(a) to Japanese Patent Application No. 2012-074311 filed Mar. 28, 2012. Each of the above application(s) is hereby expressly incorporated by reference, in its entirety, into the present application.

BACKGROUND OF THE INVENTION

1. Field of the Invention

The present invention relates to an imaging apparatus having an optical finder.

2. Description of the Related Art

In imaging apparatuses such as a digital camera that stores imaged image data obtained by performing digital processing on the imaged image signal which is output from the solid-state imaging device, some imaging apparatuses may have an optical finder mounted thereon in order to view composition of a subject.

As such an optical finder, a finder device has been known that has a display unit built therein so as to allow observing an image, in which an image displayed on the display unit overlaps with an optical image obtained through an objective optical system, from an eyepiece window (for example JP1991-292067A (JP-H03-292067A) reference).

The finder device described in JP1991-292067A (JP-H03-292067A) is convenient for use with a combination of an optical finder and an electronic finder, and is thus excellent in convenience. However, compared with an optical finder used in a general camera, it is necessary to add new components such as an optical system that guides an image displayed on the display unit into the eyepiece window. As a result, manufacturing costs thereof become high.

As an imaging apparatus that is convenient for use with a combination of an optical finder and an electronic finder, an apparatus disclosed in JP-2010-263538A also has been known.

JP-2010-263538A discloses the imaging apparatus capable of setting either one of an OVF mode capable of observing an optical image of a subject from an eyepiece window and an EVF mode capable of observing an image displayed on a display unit from the eyepiece window.

In the OVF mode of the imaging apparatus disclosed in JP-2010-263538A, an optical image, which is obtained through an objective optical system, can be observed from an eyepiece window of an eyepiece optical system by retracting a display unit and an optical system from a finder optical path. The optical system is for guiding light of an image displayed on the display unit into the eyepiece window.

On the other hand, in the EVF mode, a part of the eyepiece optical system is retracted from the finder optical path, and the optical system for guiding the image displayed on the display unit into the eyepiece window is inserted to a position from which the part is retracted. Thereby, it is possible to observe the image displayed on the display unit from the eyepiece window.

In the imaging apparatus disclosed in JP-2010-263538A, it is necessary to add an optical system for the EVF mode to the configuration of the optical finder used in a general camera. Hence, similarly to JP1991-292067A (JP-H03-292067A), an increase in costs is a problem.

JP-2008-158441A describes an imaging apparatus capable of switching between the OVF mode and the EVF mode by removably providing the display unit between a pentaprism and a focusing screen which is at a position where an optical image is formed through a imaging optical system.

The imaging apparatus described in JP-2008-158441A is configured such that the display unit is removable from the space between the pentaprism and the focusing screen. Hence, a separate optical system for the EVF mode becomes unnecessary, and thus there is no concern about increase in costs.

SUMMARY OF THE INVENTION

However, in the imaging apparatus described in JP-2008-158441A, although there is no concern about increase in costs, there is a concern that visibility in the finder may be lowered by foreign matter. The reason for this is that, since the display unit is inserted to or retracted from a narrow space between the pentaprism and the focusing screen, foreign matter such as dust caused by insertion and retraction of the display unit is likely to be attached to the focusing screen or the pentaprism.

The present invention has been made in consideration of the situation, and its object is to provide an imaging apparatus that is convenient for use with a combination of an optical finder and an electronic finder and is capable of minimizing manufacturing costs while preventing visibility in the finder from being lowered.

According to the present invention, there is provided an imaging apparatus including: an objective optical system; an optical finder through which a subject imaged on an imaging plane by the objective optical system is observable, where the optical finder includes an eyepiece optical system which is fixed at a position closer to an eyepiece window than the imaging plane, and a display device which is provided at a position in the imaging plane so as to be removable; a display device control unit that controls removal of the display device; and an objective optical system control unit that controls positions of optical members constituting the objective optical system, in which in an electronic finder mode for observing an image displayed on the display device from the eyepiece window, the objective optical system control unit performs position control to change a position of the optical member of the objective optical system, which is closest to the imaging plane, to a corresponding position in an optical finder mode for observing the subject imaged on the imaging plane from the eyepiece window, and to make a distance between the imaging plane and the optical member, which is close to the subject in a direction perpendicular to the imaging plane and constitutes the objective optical system, larger than a corresponding distance in the optical finder mode, and in which in the electronic finder mode, the display device control unit performs control to insert the display device to the position in the imaging plane in a state where the distance between the imaging plane and the optical member, which is close to the subject in a direction perpendicular to the imaging plane and constitutes the objective optical system, is increased through the position control of the objective optical system control unit.

According to the present invention, it is possible to provide an imaging apparatus that is convenient for use with a combination of an optical finder and an electronic finder and is capable of minimizing manufacturing costs while preventing visibility in the finder from being lowered.

BRIEF DESCRIPTION OF THE DRAWINGS

FIG. 7 is a diagram illustrating an operation in the EVF mode of the finder device 15a.

DESCRIPTION OF THE PREFERRED EMBODIMENTS

Hereinafter, embodiments of the present invention will be described with reference to the accompanying drawings.

Figure 1:
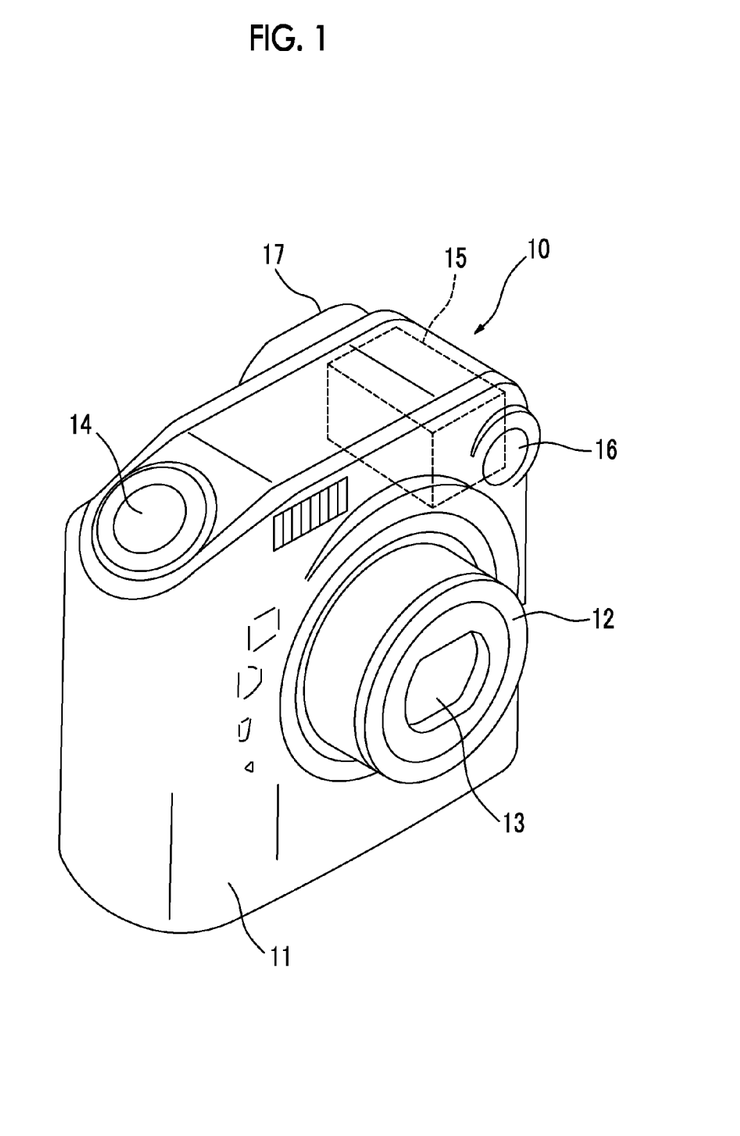
FIG. 1 is an exterior perspective view illustrating a digital camera 10 according to a first embodiment of the present invention.

FIG. 1 is an exterior perspective view illustrating a digital camera 10 according to a first embodiment of the present invention.

The digital camera 10 has a casing 11 having a rectangular shape. A lens barrel 12 is provided at the front center of the casing 11. An imaging lens (a focus lens for focusing, a zoom lens, and the like) 13 is housed in the lens barrel 12.

A shutter release button 14 is provided on one side of the upper end surface of the casing 11. A finder device 15 is provided at the corner on the side opposite to the shutter release button 14 on the upper end surface of the casing 11. A subject side finder window 16 of the finder device 15 is provided at the corner portion at the front of the casing 11. An eyepiece window 17 of the finder device 15 is provided on a portion close to the rear surface of the casing 11 facing the subject side finder window 16.

Figure 2:
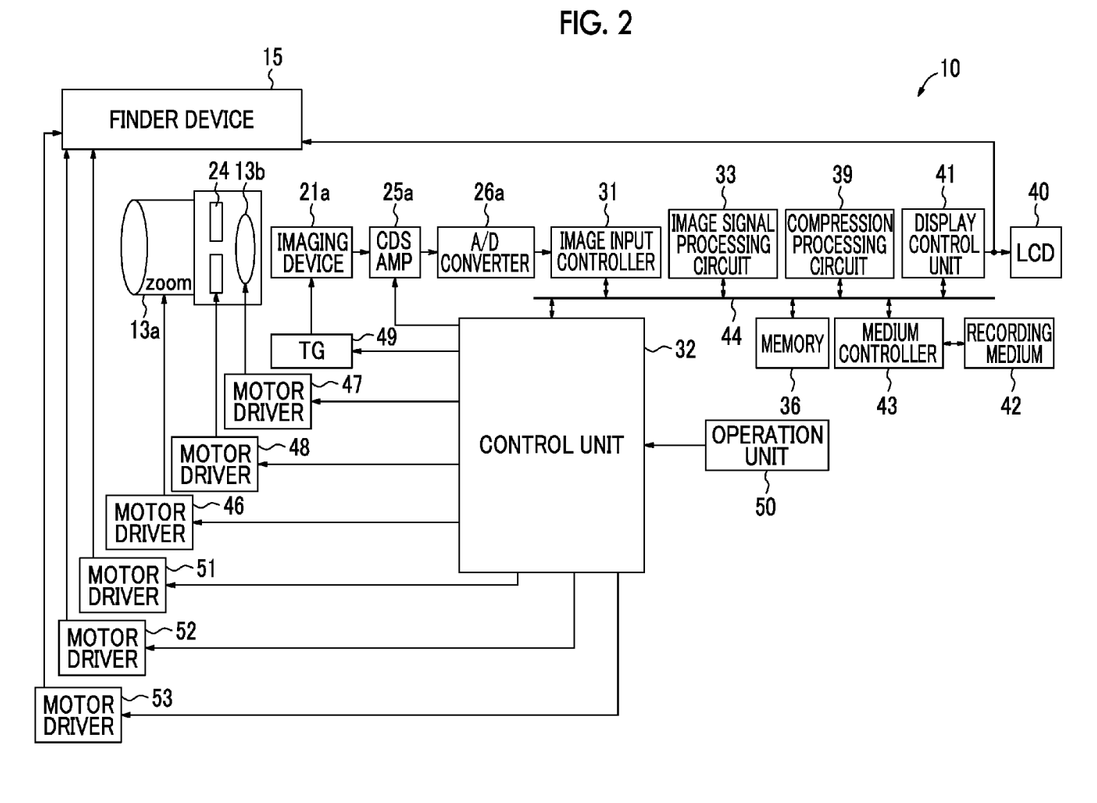
FIG. 2 is an internal block configuration diagram of the digital camera 10 shown in FIG. 1.

FIG. 2 is an internal block configuration diagram of the digital camera 10 shown in FIG. 1.

The digital camera 10 includes: a CCD solid-state imaging device 21a; an imaging optical system that is placed at the front end of the solid-state imaging device 21a; a CDSAMP 25a that performs analog signal processing on an output signal (imaged image signal) of the solid-state imaging device 21a; an A/D converter 26a that converts the output signal of the CDSAMP 25a into a digital signal; and a finder device 15. Here, the imaging optical system includes the imaging lens 13 (a zoom lens is referenced by 13a, and a focus lens is referenced by 13b), and a diaphragm (iris) 24.

It should be noted that the solid-state imaging device 21a is a CCD type in an example of FIG. 2 but may be a different type solid-state imaging device such as a CMOS type.

The digital camera 10 further includes: an image input controller 31 that acquires the digital imaged image signal which is output from the A/D converter 26a; a control unit 32 that integrally controls the entire digital camera 10; an image signal processing circuit 33 that generates imaged image data through image processing performed on the imaged image signal received by the image input controller 31; a memory 36 that includes a RAM used as a work memory, a ROM storing various kinds of data, and the like; a compression processing circuit 39 that compresses the imaged image data subjected to the image processing into a JPEG image or an MPEG image; a display control unit 41 that displays the imaged image or a live view image on a liquid crystal display device 40 provided on a camera rear surface or the like or displays various images on a display unit 19 to be described later in the finder device 15; a medium controller 43 that records the imaged image data in a recording medium 42; and a bus 44 that connects those to each other.

The control unit 32 is connected to an operation unit 50 including the shutter release button 14 and the like shown in FIG. 1. On the basis of a user's instruction which is input through the operation unit 50, the control unit 32 controls the digital camera 10.

The digital camera 10 further includes: a motor driver 46 that supplies driving pulses to a driving motor of a zoom lens 13a; a motor driver 47 that supplies driving pulses to the driving motor of a focus lens 13b; a motor driver 48 that supplies a driving signal to the driving motor which performs diaphragm control on a diaphragm 24; a motor driver 53 that supplies a driving signal to the driving motor which performs position control on an OVF shutter 22 in the finder device 15 to be described later; a timing generator (TG) 49 that supplies driving timing pulses to the solid-state imaging device 21a; a motor driver 51 that supplies a driving signal to the driving motor which performs position control on the display unit 19 in the finder device 15 to be described later; and a motor driver 52 that supplies a driving signal to the driving motor which performs position control on the objective optical system in the finder device 15 to be described later. The motor drivers 46, 47, 48, 51, 52, and 53 and the TG 49 are operated on the basis of commands issued from the control unit 32. Further, the CDSAMP 25a is also operated on the basis of a command issued from the control unit 32.

Figure 3:
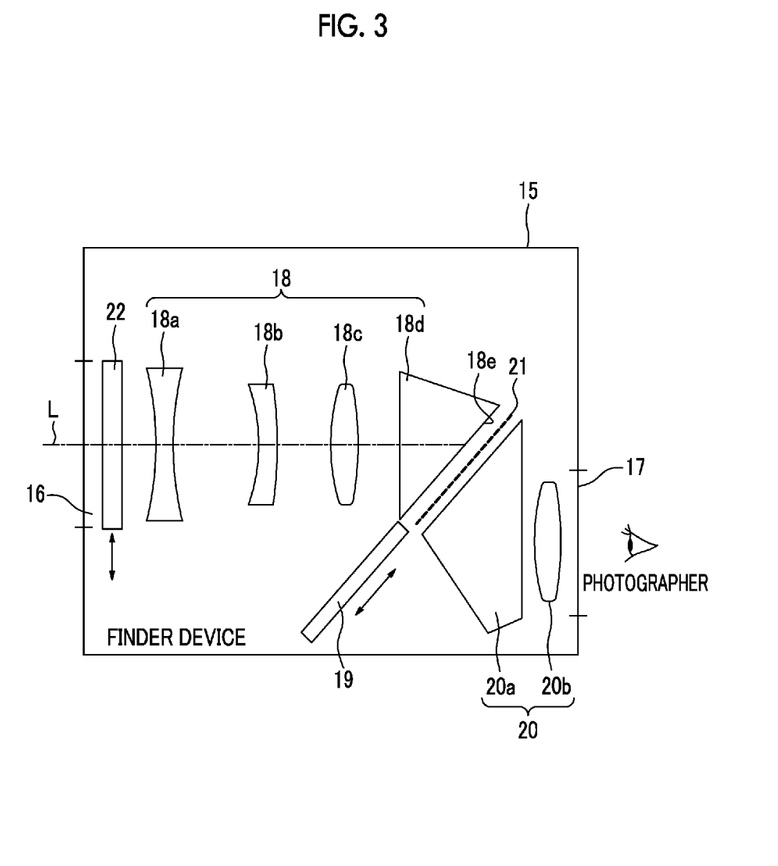
FIG. 3 is a diagram illustrating an internal configuration of a finder device 15 in the digital camera 10 shown in FIG. 2.

FIG. 3 is a diagram illustrating an internal configuration of the finder device 15 in the digital camera 10 shown in FIG. 2.

The finder device 15 includes the subject side finder window 16; the eyepiece window 17; the OVF shutter 22; an objective optical system 18; an eyepiece optical system 20; and a display unit 19.

The objective optical system 18 forms an image of a subject on an imaging plane 21, and is constituted of, for example, a lens 18a, a lens 18b, a lens 18c, and a prism 18d.

The objective optical system 18 is configured such that all the optical members constituting the system are able to change their positions in a direction of an optical axis L by using a driving motor which is not shown. The driving motor controls a position of the objective optical system 18 in accordance with the driving signal supplied from the motor driver 52 shown in FIG. 1.

Subject light, which is incident from the subject side finder window 16, passes through the lens 18a, the lens 18b, and the lens 18c, is incident into the prism 18d where a travel direction of the subject light is changed to a direction oblique to the optical axis L, and exits from an exit surface 18f of the prism 18d. The image of the subject light exiting from the exit surface 18f of the prism 18d is formed on the imaging plane 21 parallel with the exit surface 18f.

The eyepiece optical system 20 is provided in order to observe the subject imaged on the imaging plane 21 from the eyepiece window 17. The eyepiece optical system 20 is constituted of, for example, a prism 20a and a magnifying lens 20b. The eyepiece optical system 20 is fixed at a position in the finder device 15.

The OVF shutter 22 is removably provided on the optical path along the optical axis L. The position of the OVF shutter 22 is controlled by a driving motor which is not shown. The driving motor is driven by the motor driver 53 shown in FIG. 2.

The OVF shutter 22 is able to attain a closed state where the shutter is inserted in the optical path of the finder device 15 and an open state where the shutter is retracted from the optical path of the finder device 15.

In the closed state, the OVF shutter 22 is inserted to a position at which the shutter covers the subject side finder window 16. Hence, in the closed state, subject light, which is incident into the subject side finder window 16, is blocked by the OVF shutter 22, and the subject light is prevented from being incident into the eyepiece window 17.

Further, in the open state, the OVF shutter 22 is retracted to a position where the shutter does not cover the subject side finder window 16. Hence, in the open state, the subject light, which is incident into the subject side finder window 16, is transmitted without being blocked by the OVF shutter 22, and the subject light is incident into the eyepiece window 17.

It should be noted that the OVF shutter 22 may be configured such that a plate-like member absorbing or reflecting light is mechanically inserted or retracted. In addition, the OVF shutter 22 may be configured as an element (for example, a liquid crystal shutter) capable of electrically controlling the transmittance thereof.

The display unit 19 is constituted by, for example, a liquid crystal display device, and is removably provided at the position in the imaging plane 21 which is located between the objective optical system 18 and the eyepiece optical system 20. The position of the display unit 19 is controlled by the driving motor which is not shown. The driving motor is driven by the motor driver 51 shown in FIG. 2.

The display unit 19 is inserted between the objective optical system 18 and the eyepiece optical system 20 such that the position of the image display surface substantially coincides with that of the imaging plane 21 in a state where the image display direction is directed to face the eyepiece optical system 20. In the state where the display unit 19 is inserted between the objective optical system 18 and the eyepiece optical system 20, the image displayed on the display unit 19 is observed from the eyepiece window 17 through the eyepiece optical system 20.

In contrast, in the state where the display unit 19 is retracted from the space between the objective optical system 18 and the eyepiece optical system 20, the subject imaged on the imaging plane 21 is observed from the eyepiece window 17 through the eyepiece optical system 20.

The display unit 19 displays an image (an image for checking a recorded image, a live view image, or the like) captured by the imaging device 21a, in accordance with the control of the display control unit 41.

In the digital camera 10, it is possible to set an electronic finder mode (EVF mode) for observing the image displayed on the display unit 19 from the eyepiece window 17 and an optical finder mode (OVF mode) for observing the subject, which is imaged on the imaging plane 21 through the objective optical system 18, from the eyepiece window 17.

Hereinafter, operations in the OVF mode and the EVF mode of the digital camera 10 will be described. Switching between the OVF mode and the EVF mode can be performed by, for example, an operation of the operation unit 50.

When the OVF mode is set, the control unit 32 fixes the respective optical members of the objective optical system 18 to positions (positions exemplified in FIG. 3) which are determined in advance. Further, the control unit 32 performs control to attain the state where the OVF shutter 22 is open. Furthermore, the control unit 32 performs control to attain the state where the display unit 19 is retracted from the space (the position in the imaging plane 21) between the eyepiece optical system 20 and the objective optical system 18.

Due to the control, the subject light, which is incident from the subject side finder window 16, is imaged on the imaging plane 21, and thus it is possible to observe the imaged subject from the eyepiece window 17 through the eyepiece optical system 20.

Figure 4:
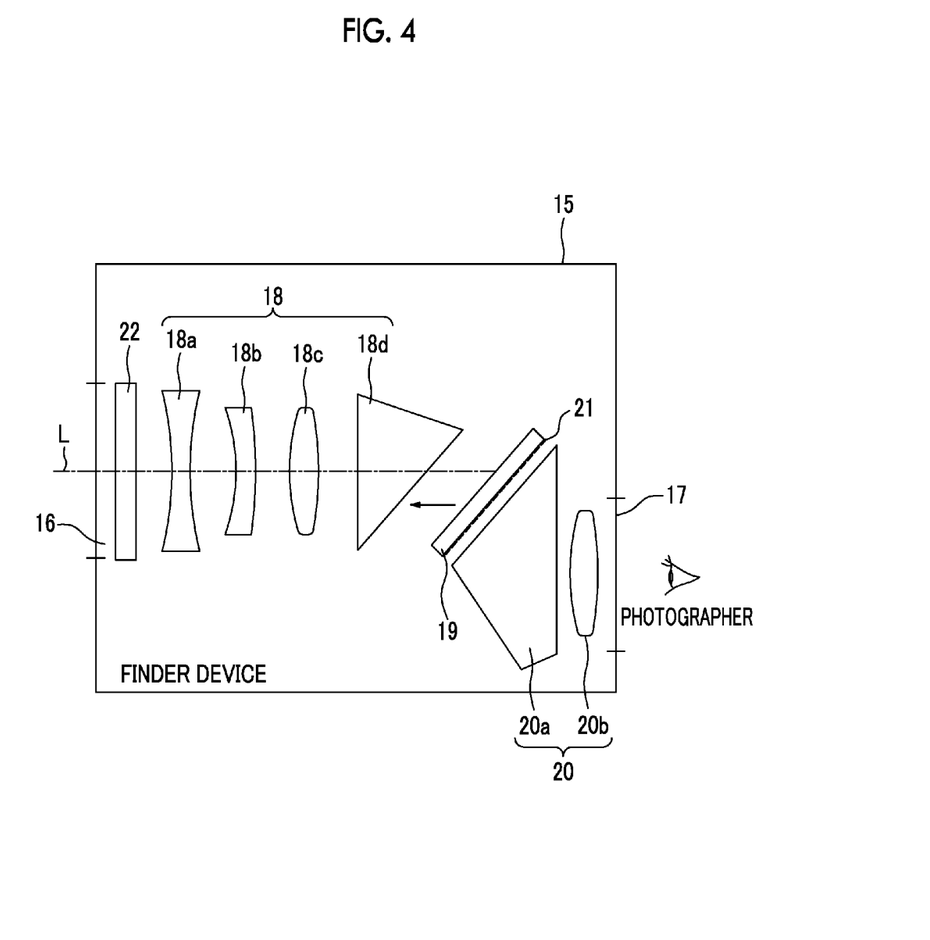
FIG. 4 is a diagram illustrating an operation in the EVF mode of the digital camera 10 shown in FIG. 1.

When the EVF mode is set, as shown in FIG. 4, the control unit 32 performs control to attain the state where the OVF shutter 22 is closed, and performs control to move the objective optical system 18 toward the subject side finder window 16. It should be noted that, since the objective optical system 18 is not used in the EVF mode, even when the objective optical system 18 is moved toward the subject, there is no effect on the observed image of the finder device 15.

The control unit 32 performs control to insert the display unit 19 between the eyepiece optical system 20 and the objective optical system 18 in the state where the objective optical system 18 is moved toward the subject side finder window 16.

Due to the control, it is possible to observe the image displayed on the display unit 19 from the eyepiece window 17 through the eyepiece optical system 20.

In addition, when switching from the EVF mode to the OVF mode, the control unit 32 retracts the display unit 19 from the position in the imaging plane 21 in the state of FIG. 4, and thereafter returns the objective optical system 18 to the state of FIG. 3.

As described above, in the EVF mode, the control unit 32 performs control to move the objective optical system 18 toward the subject side finder window 16. Due to the control, a distance between the imaging plane 21 and the prism 18d in a direction perpendicular to the imaging plane 21 becomes larger than that in the OVF mode. The imaging plane 21 and the prism 18d are the optical members of the objective optical system 18 close to the subject.

Since the control unit 32 inserts or retracts the display unit 19 to or from the position in the imaging plane 21 in the state where the distance is set to be larger than that in the OVF mode, the display unit 19 is inserted or retracted in a state where the prism 18d and the display unit 19 of the objective optical system 18 are sufficiently separated.

As a result, when the display unit 19 is inserted or retracted, it is possible to reduce a probability of foreign matter such as dust becoming attached onto the prism 18d of the objective optical system 18. Thus, it is possible to prevent visibility of the observed image in the OVF mode from being lowered.

Further, since the digital camera 10 has a configuration in which the eyepiece optical system 20 used in the OVF mode is still used even in the EVF mode, it is not necessary to add a new optical system for the EVF mode. Further, in the finder device 15, it is preferable that a modification thereof be made such that a movable display unit is added to the optical finder mounted on the existing camera and the objective optical system is formed to be movable. With such a configuration, it is possible to prevent the manufacturing costs of the digital camera 10 from increasing.

As described above, the digital camera 10 is convenient for use with a combination of an optical finder and an electronic finder, and is capable of minimizing manufacturing costs while preventing visibility in the finder device 15 from being lowered.

Figure 5:
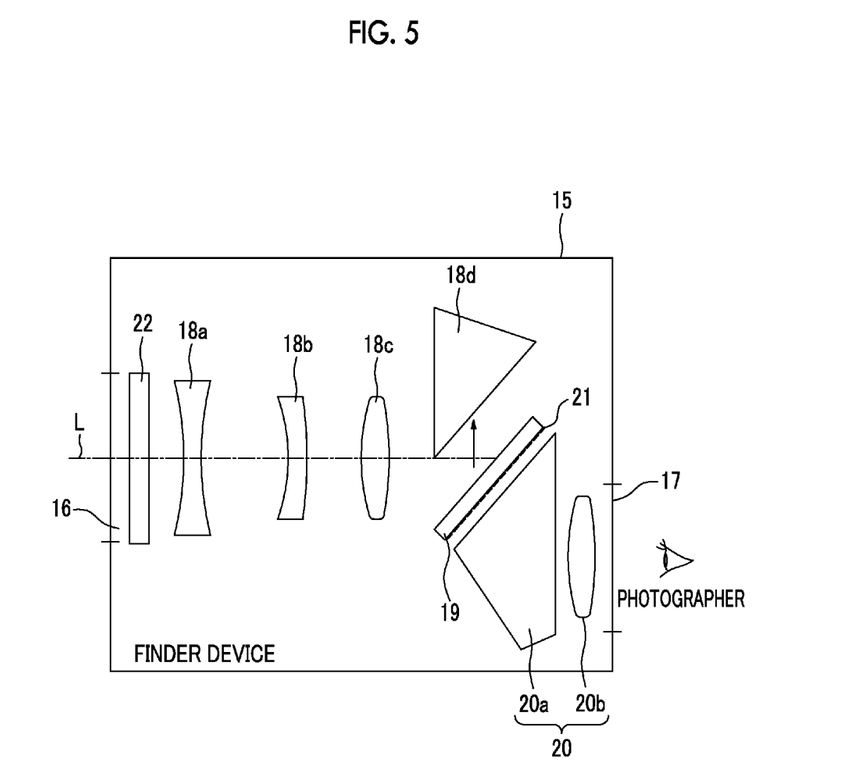
FIG. 5 is a diagram illustrating another example of the operation in the EVF mode of the digital camera 10 shown in FIG. 1.

FIG. 5 is a diagram illustrating another example of the operation in the EVF mode of the digital camera 10 shown in FIG. 1.

In the example of FIG. 4, the control unit 32 in the EVF mode moves the entire objective optical system 18 toward the subject in the optical axis direction. In contrast, in the modified example shown in FIG. 5, only the prism 18d in the objective optical system 18 is moved.

When the EVF mode is set, the control unit 32 closes the OVF shutter 22, and moves the prism 18d to be separated from the eyepiece optical system 20 in a direction intersecting with (in the example of FIG. 5, a direction orthogonal to) the optical axis L, thereby making a distance between the prism 18d and the imaging plane 21 larger than that in the OVF mode.

With such a configuration, it is also possible to obtain the above described effects.

Figure 6:
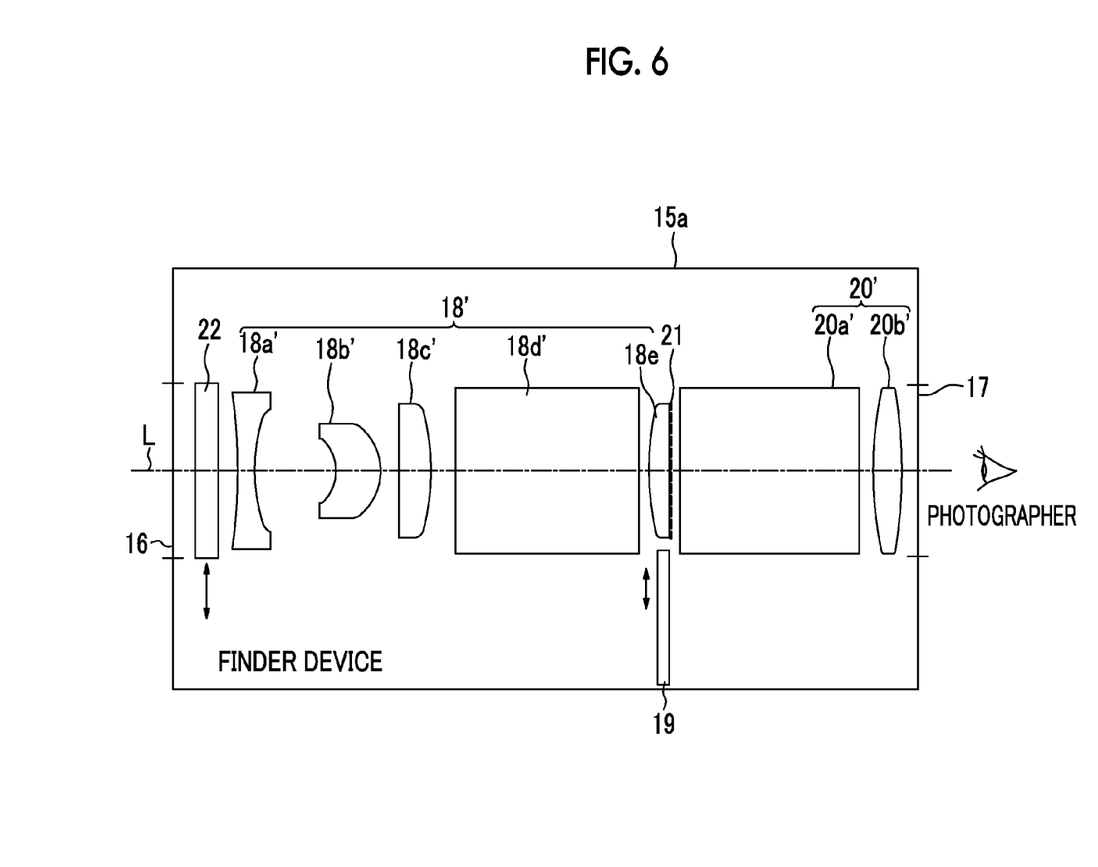
FIG. 6 is a diagram illustrating a configuration of a finder device 15a as a modified example of the finder device 15 shown in FIG. 2.

FIG. 6 is a diagram illustrating a configuration of a finder device 15a as a modified example of the finder device 15 shown in FIG. 2.

The finder device 15a is different from the finder device 15 in that the objective optical system 18 is replaced with the objective optical system 18' and the eyepiece optical system 20 is replaced with the eyepiece optical system 20'.

The objective optical system 18' includes: a lens 18a' that is positionally fixed; zoom lenses 18b' and 18c' that are movable along the direction of the optical axis L; and a prism 18d' and a field lens 18e that are movable along the direction of the optical axis L.

The eyepiece optical system 20' has a prism 20a' and a magnifying lens 20b', and its position is fixed in a similar manner to the eyepiece optical system 20.

The zoom lenses 18b' and 18c' move on the optical axis L in conjunction with the zoom lens 13a shown in FIG. 1, and their positions are controlled by the motor driver 46. By moving the zoom lenses 18b' and 18c', a focal length (angle of view) of the finder device 15a in the OVF mode is changed.

The field lens 18e is disposed near the imaging plane 21 which is formed between the objective optical system 18' and the eyepiece optical system 20'.

The field lens 18e rarely contributes to imaging, and is for guiding subject light concentrated on the imaging plane 21 into the eyepiece window 17. Since the subject light concentrated on the imaging plane 21 radiates without directivity, the subject light is directed by the field lens 18e. Thereby, the subject light concentrated on the imaging plane 21 is entirely incident into the eyepiece window 17.

In the modified example, the positions of the prism 18d' and the field lens 18e are controlled by a driving motor which is not shown. The driving motor is driven by the motor driver 52 shown in FIG. 1.

The display unit 19 is removably provided at a position in the imaging plane 21 between the objective optical system 18' and the eyepiece optical system 20', and its position is controlled by the motor driver 51 in a similar manner to FIG. 2.

When the OVF mode is set, the control unit 32 of the digital camera 10 having the finder device 15a mounted thereon opens the OVF shutter 22. Further, in the OVF mode, the control unit 32 fixes the prism 18d' and the field lens 18e to positions (for example, positions shown in FIG. 6) which are determined in advance, and moves the zoom lenses 18b' and 18c' in the direction of the optical axis L, in accordance with the zoom operation, thereby changing the finder magnification of the finder device 15a.

The position of the field lens 18e in the OVF mode is set near the imaging plane 21 such that the subject light concentrated on the imaging plane 21 can be entirely incident into the eyepiece window 17.

Figure 7:
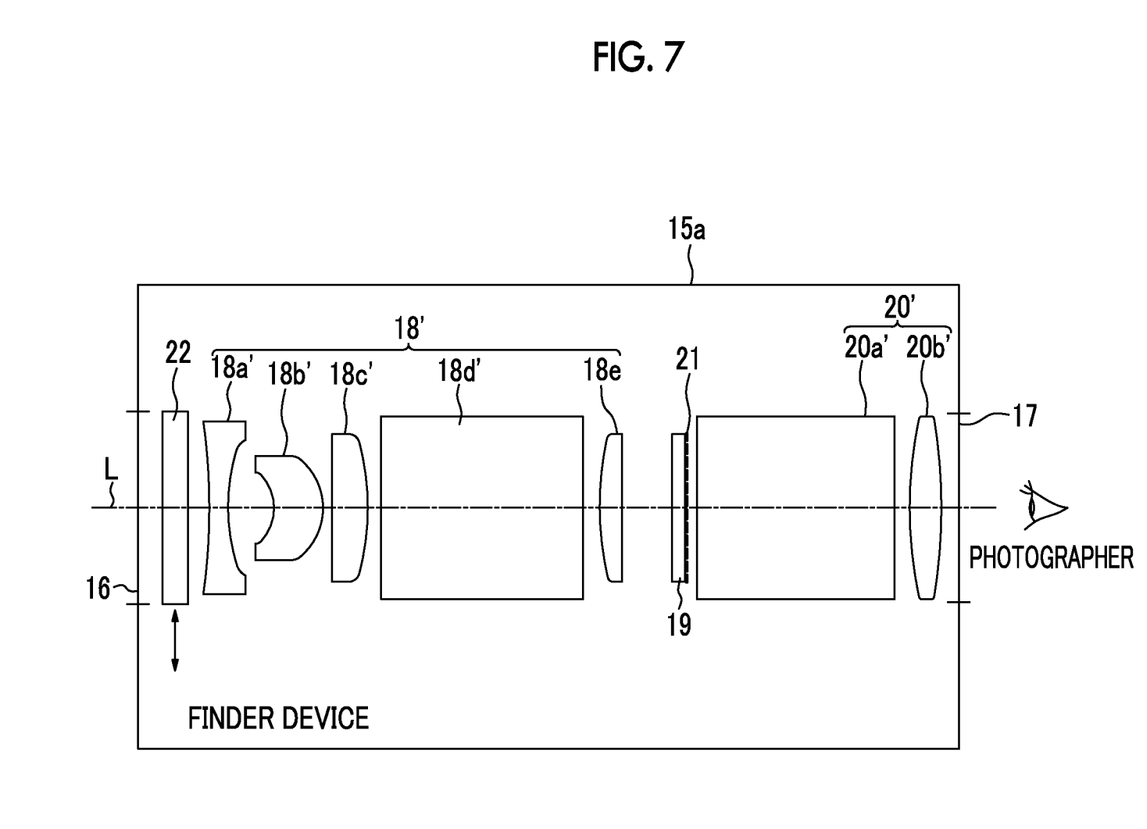

When the EVF mode is set, the control unit 32 performs control to close the OVF shutter 22 and move the zoom lenses 18b' and 18c', the prism 18d', and the field lens 18e toward the subject along the optical axis L, as shown in FIG. 7. Due to the control, a distance between the field lens 18e and the imaging plane 21 becomes larger than that in the OVF mode.

Then, the control unit 32 performs control to insert the display unit 19 into a space which is expanded through the control. At this time, the display unit 19 is inserted such that the display surface of the display unit 19 coincides with the imaging plane 21.

In addition, when switching from the EVF mode to the OVF mode, the control unit 32 retracts the display unit 19 from the position in the imaging plane 21 in the state of FIG. 7, and thereafter returns the objective optical system 18' to the state of FIG. 6.

As described above, even in the case of using the finder device 15a, the display unit 19 is removable in a state where it is not close to the field lens 18e. Thus, it is possible to obtain the same effects as the finder device 15.

Further, in a general zoom finder, the finder device 15a has the above described effects by simply moving the field lens in the direction of the optical axis, where the field lens is a member of the objective optical system closest to the eyepiece optical system. Since the zoom finder basically has a mechanism for moving a part of the objective optical system, by using the mechanism, it is possible to minimize the manufacturing costs.

Figure 8:
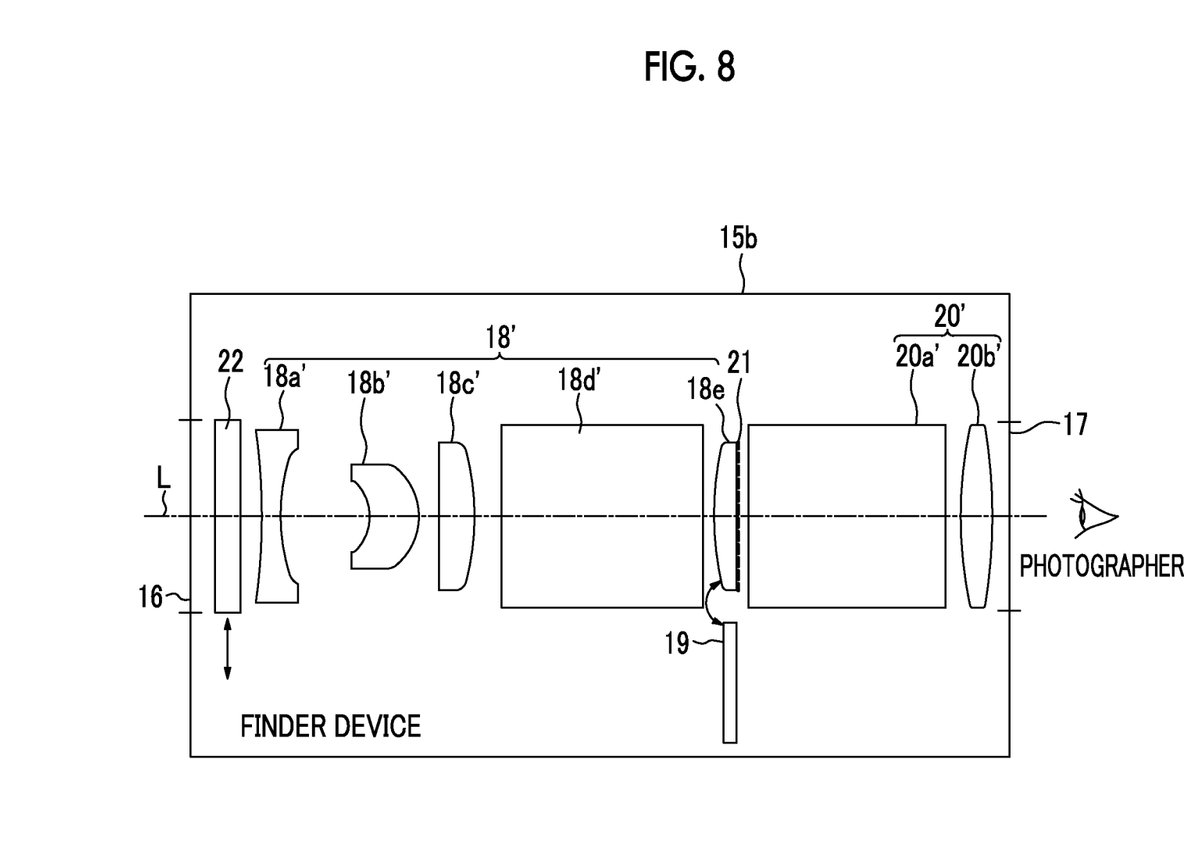
FIG. 8 is a diagram illustrating a configuration of a finder device 15b as a modified example of the finder device 15 shown in FIG. 2.

FIG. 8 is a diagram illustrating a configuration of a finder device 15b as a modified example of the finder device 15 shown in FIG. 2.

The finder device 15b has the same configuration as the finder device 15a except that the position of the prism 18d' is fixed and the field lens 18e is provided to be movable along the direction intersecting with the optical axis L.

When the OVF mode is set, the control unit 32 of the digital camera 10 having the finder device 15b mounted thereon opens the OVF shutter 22. Further, in the OVF mode, the control unit 32 fixes the prism 18d' and the lens 18a' to positions (for example, positions shown in FIG. 8) which are determined in advance, and moves the zoom lenses 18b' and 18c' in the direction of the optical axis L, in accordance with the zoom operation, thereby changing the finder magnification of the finder device 15b.

The position of the field lens 18e in the OVF mode is set near the imaging plane 21 such that the subject light concentrated on the imaging plane 21 can be entirely incident into the eyepiece window 17.

Figure 9:
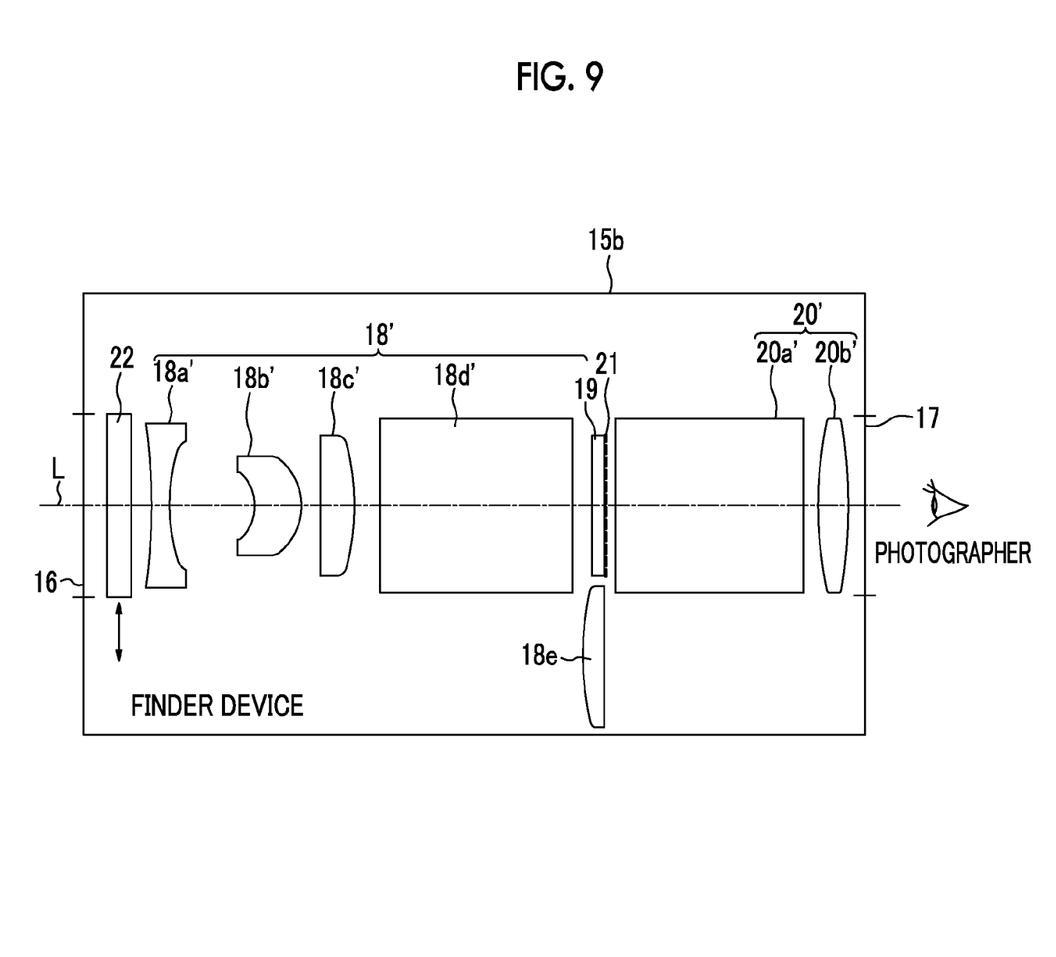
FIG. 9 is a diagram illustrating an operation in the EVF mode of the finder device 15b.

When the EVF mode is set, the control unit 32 performs control to close the OVF shutter 22 and switch between the position of the display unit 19 and the position of the field lens 18e, as shown in FIG. 9.

For example, the field lens 18e and the display unit 19 are arranged in a circumferential direction of a member having a discoid shape. The control unit 32 rotates the member, thereby inserting either one of the field lens 18e or the display unit 19 between the prism 18d' and the prism 20a'.

In the OVF mode, a member of the objective optical system 18' adjacent to the imaging plane 21 in the direction of the optical axis L is the field lens 18e, and thus there is almost no space between the imaging plane 21 and the objective optical system 18'. In contrast, when the replacement control is performed, a member of the objective optical system 18' adjacent to the imaging plane 21 in the direction of the optical axis L is the prism 18d', and thus a space is formed between the imaging plane 21 and the objective optical system 18'.

The control unit 32 inserts the display unit 19 into the formed space. Thereby, it is possible to prevent the rear surface of the display unit 19 from being close to the field lens 18e, and to prevent foreign matter from becoming attached to the field lens 18e in accordance with insertion and retraction of the display unit 19. Consequently, it is possible to prevent visibility of the observed image in the OVF mode from being lowered.

In the description of the operation of FIG. 4, in the EVF mode, the control unit 32 moves all the optical members, which constitute the objective optical system 18, toward the subject. However, by moving at least an optical member closest to the eyepiece optical system 20 of the objective optical system 18 toward the subject, it is also possible to obtain the above described effects.

In a similar manner to the finder device 15a, in the EVF mode, at least the field lens 18e may be moved in a direction to be separated from the imaging plane 21.

In addition, the finder device 15 may be configured to include the zoom lens which is movable toward the objective optical system 18 in the direction of the optical axis L. In this case, in a similar manner to the finder device 15a, it is possible to reduce the manufacturing costs by using the zoom mechanism. Further, in the zoom finder, basically there is a space for operating the zoom lens, and thus it is advantageous in design to adopt a configuration in which a part of the objective optical system is moved in the EVF mode.

In the finder device 15 or 15a, an amount of movement at the time of moving the optical member of the objective optical system closest to the subject in the EVF mode may be a distance at which foreign matter does not become attached to the optical member when the display unit 19 is inserted.

In the above description, the digital camera is exemplified, but the present invention can be applied to an imaging apparatus as long as the apparatus has a finder device. For example, even in the case where the finder device is provided in a smartphone having a camera, the technique of the embodiment can be applied.

As described above, the present specification discloses the following configurations.

An imaging apparatus disclosed includes: an objective optical system; an optical finder through which a subject imaged on an imaging plane by the objective optical system is observable, where the optical finder includes an eyepiece optical system which is fixed at a position closer to an eyepiece window than the imaging plane, and a display device which is provided at a position in the imaging plane so as to be removable; a display device control unit that controls removal of the display device; and an objective optical system control unit that controls positions of optical members constituting the objective optical system, in which in an electronic finder mode for observing an image displayed on the display device from the eyepiece window, the objective optical system control unit performs position control to change a position of the optical member of the objective optical system, which is closest to the imaging plane, to a corresponding position in an optical finder mode for observing the subject imaged on the imaging plane from the eyepiece window, and to make a distance between the imaging plane and the optical member, which is close to the subject in a direction perpendicular to the imaging plane and constitutes the objective optical system, larger than a corresponding distance in the optical finder mode, and in which in the electronic finder mode, the display device control unit performs control to insert the display device to the position in the imaging plane in a state where the distance is increased through the position control of the objective optical system control unit.

In the imaging apparatus disclosed, the optical member of the objective optical system, which is closest to the imaging plane, is a field lens which is disposed near the imaging plane in the optical finder mode.

In the imaging apparatus disclosed, in the electronic finder mode, the objective optical system control unit increases the distance by moving the field lens in the optical axis direction toward the subject from a position of the field lens in the optical finder mode.

In the imaging apparatus disclosed, in the electronic finder mode, the objective optical system control unit increases the distance by retracting the field lens from an optical axis of the objective optical system.

In the imaging apparatus disclosed, in the electronic finder mode, the objective optical system control unit increases the distance by moving the optical member of the objective optical system, which is closest to the imaging plane, in an optical axis direction of the objective optical system toward the subject from a position of the optical member in the optical finder mode.

In the imaging apparatus disclosed, in the electronic finder mode, the objective optical system control unit increases the distance by moving the optical member of the objective optical system, which is closest to the imaging plane, in a direction intersecting with an optical axis of the objective optical system from a position of the optical member in the optical finder mode.

In the imaging apparatus disclosed, the objective optical system includes a zoom lens movable along the optical axis direction.

What is claimed is:

1. An imaging apparatus comprising:
an objective optical system;
an optical finder through which a subject imaged on an imaging plane by the objective optical system is observable,
where the optical finder includes an eyepiece optical system which is fixed at a position closer to an eyepiece window than the imaging plane, and a display device which is provided at a position in the imaging plane so as to be removable;
a display device control unit that controls removal of the display device; and
an objective optical system control unit that controls positions of optical members constituting the objective optical system,
wherein in an electronic finder mode for observing an image displayed on the display device from the eyepiece window, the objective optical system control unit performs position control to change a position of the optical member of the objective optical system, which is closest to the imaging plane, to a corresponding position in an optical finder mode for observing the subject imaged on the imaging plane from the eyepiece window, and to make a distance between the imaging plane and the optical member, which is close to the subject in a direction perpendicular to the imaging plane and constitutes the objective optical system, larger than a corresponding distance in the optical finder mode, and
wherein in the electronic finder mode, the display device control unit performs control to insert the display device to the position in the imaging plane in a state where the distance is increased through the position control of the objective optical system control unit.

2. The imaging apparatus according to claim 1,
wherein the optical member of the objective optical system, which is closest to the imaging plane, is a field lens which is disposed near the imaging plane in the optical finder mode.

3. The imaging apparatus according to claim 2,
wherein in the electronic finder mode, the objective optical system control unit increases the distance by moving the field lens in an optical axis direction toward the subject from a position of the field lens in the optical finder mode.

4. The imaging apparatus according to claim 2,
wherein in the electronic finder mode, the objective optical system control unit increases the distance by retracting the field lens from an optical axis of the objective optical system.

5. The imaging apparatus according to claim 1,
wherein in the electronic finder mode, the objective optical system control unit increases the distance by moving the optical member of the objective optical system, which is closest to the imaging plane, in an optical axis direction of the objective optical system toward the subject from a position of the optical member in the optical finder mode.

6. The imaging apparatus according to claim 1,
wherein in the electronic finder mode, the objective optical system control unit increases the distance by moving the optical member of the objective optical system, which is closest to the imaging plane, in a direction intersecting with an optical axis of the objective optical system from a position of the optical member in the optical finder mode.

7. The imaging apparatus according to claim 1,
wherein the objective optical system includes a zoom lens movable along the optical axis direction.

8. The imaging apparatus according to claim 2,
wherein the objective optical system includes a zoom lens movable along the optical axis direction.

9. The imaging apparatus according to claim 3,
wherein the objective optical system includes a zoom lens movable along the optical axis direction.

10. The imaging apparatus according to claim 4,
wherein the objective optical system includes a zoom lens movable along the optical axis direction.

11. The imaging apparatus according to claim 5,
wherein the objective optical system includes a zoom lens movable along the optical axis direction.

12. The imaging apparatus according to claim 6,
wherein the objective optical system includes a zoom lens movable along the optical axis direction.

* * * * *